United States Patent [19]

Scheithauer et al.

[11] 4,454,098

[45] Jun. 12, 1984

[54] PROCESS FOR RECLAIMING TUNGSTEN FROM A HAZARDOUS WASTE

[75] Inventors: Richard A. Scheithauer; Clarence D. Vanderpool; Michael J. Miller; Martin B. MacInnis, all of Towanda, Pa.

[73] Assignee: GTE Products Corporation, Stamfort, Conn.

[21] Appl. No.: 556,765

[22] Filed: Dec. 1, 1983

[51] Int. Cl.³ .............................................. C01G 41/00
[52] U.S. Cl. ........................................ 423/55; 423/53; 423/61; 75/6
[58] Field of Search .................... 423/53, 55, 61; 75/6

[56] References Cited

U.S. PATENT DOCUMENTS

| | | | |
|---|---|---|---|
| 2,556,255 | 6/1951 | Carosella | 423/58 |
| 2,893,832 | 7/1959 | Loring | 423/58 |
| 3,674,424 | 7/1972 | Stanley et al. | 423/87 |
| 4,420,331 | 12/1983 | Sant et al. | 423/61 |

Primary Examiner—Herbert T. Carter
Attorney, Agent, or Firm—Robert E. Walter

[57] ABSTRACT

A process is disclosed wherein tungsten is recovered from hazardous waste material containing said tungsten, arsenic, and other impurities which can consist of magnesium, phosphorus, and silicon and the resulting waste is treated to render it nonhazardous according to EPA standards for arsenic. Said process involves digesting said hazardous waste material in an aqueous solution of an alkali metal hydroxide, adjusting the pH of the resulting solution to about 11.0 to about 13.0 with NaOH to precipitate essentially all of the magnesium and silicon species, filtering the digestion mix to remove the solids from said resulting solution which contains about 80 to about 100% of said tungsten and essentially none of said magnesium and said silicon, slurrying the hazardous solids in hot water, and adding to the slurry a ferric salt solution to precipitate ferric hydroxide, filtering this mixture to give a solid which passes the EPA standard test for solids with respect to arsenic.

6 Claims, No Drawings

PROCESS FOR RECLAIMING TUNGSTEN FROM A HAZARDOUS WASTE

This invention relates to a process in which tungsten is recovered from hazardous material containing arsenic and the hazardous material is rendered nonhazardous by EPA standards. More particularly, it relates to a process in which tungsten is extracted from hazardous waste material containing arsenic and the resulting waste is treated with a ferric salt to render it nonhazardous according to the EPA standards for arsenic.

In the processing of tungsten ores to pure tungsten products, the ore is first digested with sodium hydroxide or sodium carbonate to yield an impure sodium tungstate solution. Arsenic present in the tungsten ores is also solubilized by this operation. Removal of arsenic from the impure sodium tungstate solution is routinely accomplished by treating the impure sodium tungstate solution with magnesium chloride hexahydrate and ammonium hydroxide at a pH of about 9.4 to precipitate the arsenic as ammonium magnesium arsenate. Silicon, phosphorus and varying amounts of tungsten also are present in the filtered solids. Tungsten contained in the solids appears to be there partly as occluded sodium tungstate, and partly as some insoluble tungsten compound. Repeated water washings of this precipitate does recover some but not all of the contained tungsten. This precipitate contains from about 10% to about 40% tungsten on a dry weight basis. It is classified as a hazardous waste since it is above the limits set for arsenic as determined by the EP toxicity test for solids.

Because of the much greater expense involved in disposing of a hazardous waste versus a nonhazardous waste, the rendering of this waste as nonhazardous results in considerable cost savings. Furthermore, the ability to reclaim tungsten values from the waste before disposal also involves a considerable saving.

SUMMARY OF THE INVENTION

In accordance with one aspect of the invention, hazardous material containing tungsten, arsenic, with various amounts of magnesium, silicon, and other elements is digested with dilute alkali metal hydroxide at a pH of about 10.0 to about 13.0. The pH of the digestion solution is then adjusted to about 9.5 to about 10.0 to form a two phase system consisting of a solid and a liquid phase wherein essentially all of the magnesium, and silicon, and a portion of the arsenic are in the solid phase and the tungsten and the remaining arsenic are in the liquid phase. The liquid phase and solid phase are then separated by filtration. Water is then added to the solid phase in an amount sufficient to form an aqueous slurry. A solution of a ferric salt is then added to the slurry in the ratio of about 0.5 to about 3.0 moles of Fe to about 1 mole of As, and the resulting mixture stirred for a sufficient time to form solids which pass the EP toxicity test with respect to arsenic and which are considered nonhazardous. The solids are then separated from the mixture by a technique such as filtration.

DETAILED DESCRIPTION OF THE INVENTION

The hazardous material of the invention can be the solids resulting from the treatment of sodium tungstate solutions with magnesium chloride and ammonium hydroxide. The solids can contain about 10 to about 40% by weight of tungsten with typical amounts being about 20 to about 30% on a dry weight basis and about 0.5% to about 4.0% arsenic, with typical amounts being about 0.5 to about 4.0%. The solids are classified as hazardous because they do not pass the EPA tests for arsenic. The solids also contain various amounts of other impurities as magnesium, silicon, and phosphorus.

The hazardous material is digested with an aqueous solution of an alkali metal hydroxide preferably sodium hydroxide at a pH of about 10.0 to about 13.0 with about 11 to about 12.0 being preferred temperatures of from about 60° C. to about 100° C. are used with from about 80° C. to about 95° C. being preferred. Reaction times of from about 1 hour to about 10 hours are used with from about 3 hours to about 6 hours being preferred. During the course of the digestion, the pH of the digestion solution is adjusted to from about 9.0 to about 11.0 with about 9.5 to about 10.0 being preferred. Adjustment is generally made with mineral acid, preferably $H_2SO_4$. The digestion solution and solids are then separated by any standard technique such as filtration. The digestion solution can contain greater than about 95% by weight of the tungsten, greater than about 50% by weight of the arsenic, and essentially no magnesium or silicon. Essentially all of the magnesium and silicon, and the remainder of the arsenic, (less than about 50% by weight), remain in the solids as a result of the pH adjustment of the digestion solution to about 9.5 to about 10.0 after the digestion. The tungsten values can be recovered from the digestion solution by conventional methods. The solids are determined to be hazardous since they do not pass the EP toxicity test for solids with respect to arsenic. Values greater than about 5.0 mg As/liter in the leachate from the toxicity test are reported. The limit set by the EPA is 5.0 mg As/liter. The resulting solids are generally slurried with about 3.0 to about 10.0 milliliters of water per gram of solids, with about 4.0 to about 6.0 milliliters per gram being preferred. Water temperatures are from about 60° C. to about 100° C. with about 70° to about 80° C. being preferred. An aqueous solution of a ferric salt, preferably $FeCl_3$ sufficient to give a ratio of about 0.5 to about 3.0 moles Fe to 1 mole of As is used. From about 1.0 to about 2.0 moles of Fe are preferred. The salt solution is added to the water-hazardous solid slurry. The resulting mixture is stirred for about 20 to about 60 minutes with about 30 to about 40 minutes being preferred. The resulting solution and solids are then separated by standard techniques such as filtration. The solids pass the EPA test, that is, they give a test solution of less than 5.0 mg As per liter and are therefor considered nonhazardous with respect to arsenic.

To more fully illustrate this invention, the following example is presented. All parts, portions, and percentages are on a weight basis unless otherwise stated.

EXAMPLE

Five different lots of hazardous material are digested with about 1500 parts of dilute NaOH solution at a pH of about 12 at about 90° C. for about 3 hours. The charges for each digestion along with analysis of each lot are given in Table 1.

TABLE I

| Lot # Charge # | Parts of material (dry wt) | Typical Composition of Material % of Element on Dry Basis | | | |
|---|---|---|---|---|---|
| | | W | Mg | Si | As |
| 1 | 84 | 16 | 11 | 8.0 | 1.3 |
| 2 | 96 | 31 | 11 | 4.5 | 1.5 |

TABLE I-continued

| Lot # Charge # | Parts of material (dry wt) | Typical Composition of Material % of Element on Dry Basis | | | |
|---|---|---|---|---|---|
| | | W | Mg | Si | As |
| 3 | 108 | 35 | 9.8 | 4.8 | 2.1 |
| 4 | 84 | 17 | 16 | 9.8 | 0.69 |
| 5 | 99 | 31 | 12 | 5.3 | 1.8 |

The resulting mixtures are then filtered and the resulting solids are divided into two equal portions. The filtrate is analyzed to determine the amount of tungsten and arsenic extracted and is shown in Table 2.

TABLE 2

| | % Leached (1) | | EP Toxicity Test Values for Arsenic (2) | |
|---|---|---|---|---|
| Lot # | W | As | No Treatment | FeCl₃ Treatment |
| 1 | 97 | 60 | 3 | 1 |
| 2 | 98 | 56 | 5.0 | 2 |
| 3 | 95 | 75 | 9 | 4.9 |
| 4 | 98 | 55 | 3 | 2 |
| 5 | 94 | 67 | 7 | 4 |

(1) From analysis of original digestion solution.
(2) mg As/l in leachate.

The first portion of solids from each of the five digestions is slurried in water at about 90° C. for about 1 hour. A solution of $FeCl_3 \cdot 6(H_2O)$ is then added in an amount to give a mole ratio of Fe to As of about 1 to each slurry and the resulting mixtures are stirred for an additional 1 hour and then filtered. The second portion of solids from each of the five digestions are slurried in water according to the same procedure as carried out for the first portion. However, no ferric chloride is added to the second portion. Both of the solid residues from each of the five digestions are submitted for the EP toxicity test. Results of the test are given in Table 2. From the results in Table 2 it can be seen that (1) tungsten can be recovered from the hazardous waste, and that (2) the ferric chloride treated solids all passed the EP toxicity test, that is the leachates contained less than the 5.0 mg As/liter the allowable limit. Three of the five samples not treated with ferric chloride but only water washed, failed this test as is shown by the level of greater than 5.0 mg As/l in the leachates, and therefore must be treated as hazardous material.

While there has been shown and described what are at present considered the preferred embodiments of the invention, it will be obvious to those skilled in the art that various changes and modifications can be made therein without departing from the scope of the invention as defined by the appended claims.

What is claimed is:

1. A process for treating hazardous material containing tungsten, arsenic, magnesium, silicon, and other elements to recover said tungsten and to render the remaining material nonhazardous with respect to arsenic, said process comprising:
   (a) digesting said material in an aqueous solution of an alkali metal hydroxide, at a pH of from about 10.0 to about 13.0, for a sufficient period of time to produce a digestion solution containing about 80% to about 100% of said tungsten, and an insoluble material containing arsenic in an amount sufficient to render said insoluble material hazardous,
   (b) adjusting the pH of said digestion solution to about 9.5 to about 10.0 to form a two phase system consisting of a solid phase and a liquid phase wherein essentially all of said magnesium and said silicon, and a portion of said arsenic are in said solid phase, and a major portion of the tungsten and the remainder of said arsenic are in said liquid phase,
   (c) separating said solid phase from said liquid phase,
   (d) adding to said solid phase an amount of water sufficient to form an aqueous slurry
   (e) adding to the resulting slurry an aqueous solution of a ferric salt in an amount sufficient to give about 0.5 to about 3.0 moles of Fe to 1 mole of As,
   (f) stirring the resulting mixture for about 20 to about 60 minutes to produce a solid nonhazardous material from said resulting mixture.

2. A process according to claim 1 wherein the alkali metal hydroxide is sodium hydroxide.

3. A process according to claim 1 wherein the digestion temperature is from about 60° C. to about 100° C.

4. A process according to claim 1 wherein the digestion time is from about 1 to about 10 hours.

5. A process according to claim 1 wherein said insoluble material is slurried in water at about 60° C. to about 100° C. for about 0.2 to about 1.0 hours.

6. A process according to claim 1 wherein the ferric salt is $FeCl_3$.

* * * * *